INVENTOR.
HARLEY S. KOESHALL
BY
James E. Nilles
ATTORNEY

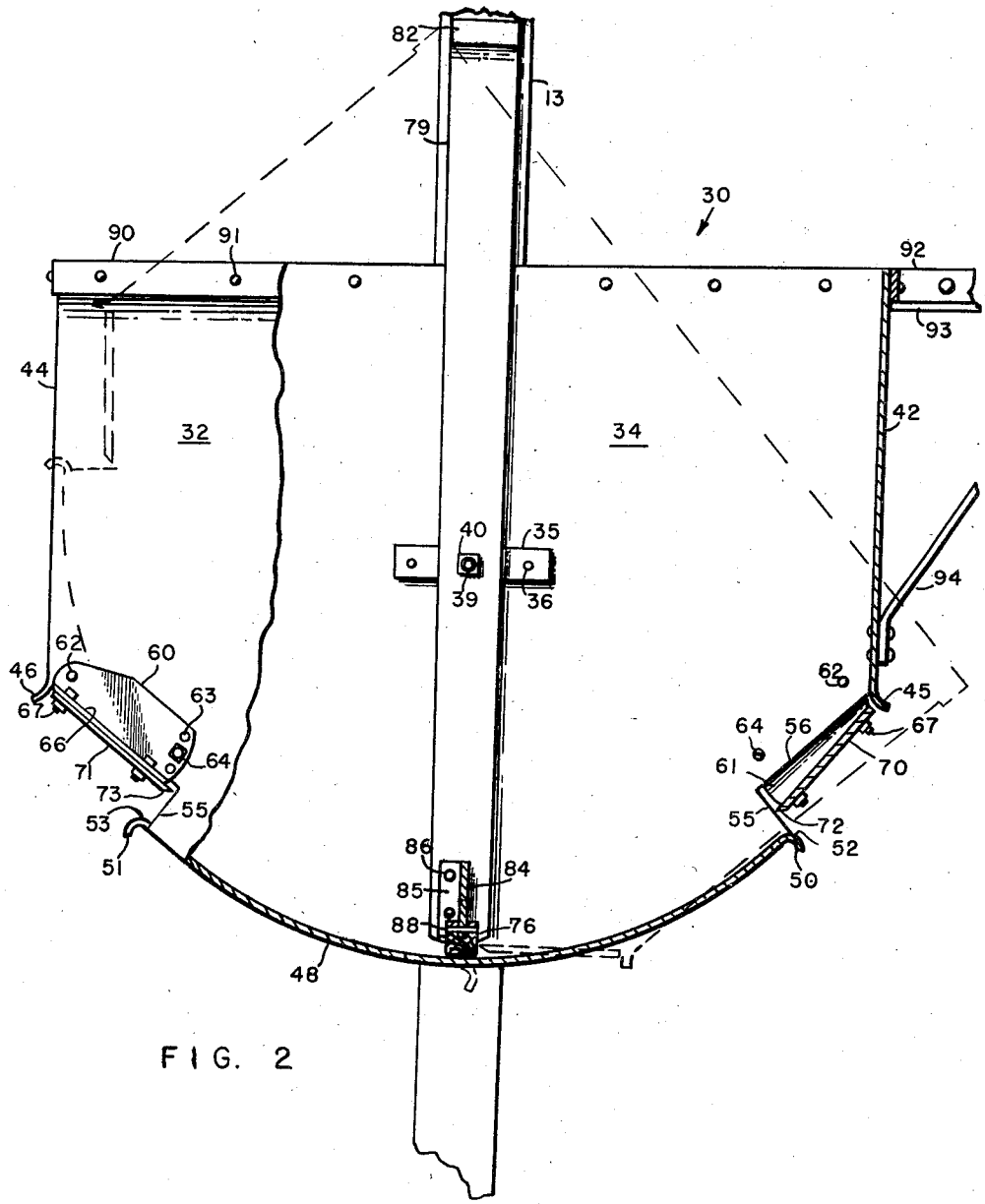

United States Patent Office 2,807,298
Patented Sept. 24, 1957

2,807,298
SWINGING HOPPER TYPE VEGETABLE CHOPPER
Harley S. Koeshall, Racine, Wis.

Application March 28, 1956, Serial No. 574,479

8 Claims. (Cl. 146—64)

This invention relates to cutters or comminutors for vegetables and the like of the type in which the material holding hopper is swingably mounted.

An object of this invention is to provide an improved vegetable chopper of the swinging hopper type having two spaced cutting blades fixed thereto which cooperate with a fixed cutting block mounted within the hopper.

Another object of the invention is to provide an improved vegetable cutter which is highly efficient in operation and in which cutting action occurs whenever the hopper is in motion. The action is such that the material to be cut is always positioned in cutting relationship to the cutter elements and a positive and full cutting stroke is assured.

Another object of the invention is to provide a chopper which is self cleaning and completely empties itself in operation.

The embodiment of the invention chosen for illustrative purposes finds particular utility for chopping produce such as cabbage, beets and other root crops, green corn, etc., for use as feed for livestock. In preparing this material for the livestock, it is desirable to cut only what the animal needs at the time, and as a result such a chopper finds daily use for relatively short periods of time. The present device is so constructed that it completely empties itself in operation and requires little maintenance in this respect. It is of clean design which affords few places for fragments of the material to accumulate.

Other objects and advantages of this invention will become more apparent from the following detailed description and attached sheets of drawings wherein a form of the invention is illustrated. Accordingly, the present invention may be considered as comprising the various constructions, combinations, or sub-combinations of parts as is hereinafter more fully set forth in the detailed description and in the claims, reference being had to the accompanying drawings in which:

Figure 2 is a side elevational view of the device shown in Figure 1 but on an enlarged scale, partially in section and with certain parts removed for the sake of clarity in the drawings.

Figure 1:
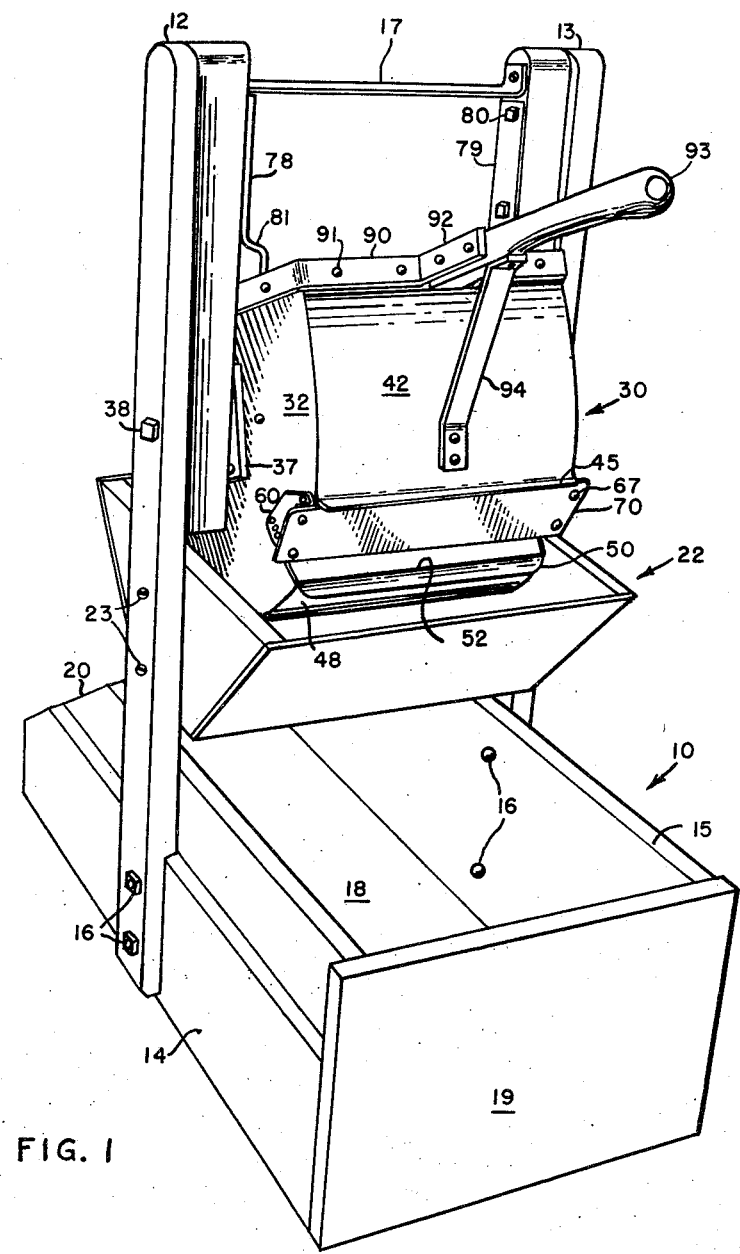
Figure 1 is a perspective view of a chopper embodying this invention.

Referring more particularly to Figure 1, the support structure includes a base 10 having an upright member 12, 13 secured to its side 14, 15, respectively, by bolt means 16. A transverse strap iron brace 17 connects the upper ends of uprights 12, 13 together to form a rigid support structure. The base 10 also includes a floor 18 and end wall 19 thus forming a box having its other end 20 open to permit removal of the cut material with a shovel. A collecting trough 22 is secured by screws 23 to uprights 12, 13 above the box 10, and serves to guide the cut material through its open bottom into the box.

The hopper 30 is swingably mounted between uprights 12, 13 for oscillatory swinging movement. The vertical side walls 32, 34 (Figure 2) of the hopper each have a reinforcing strap iron bearing plate 35 secured by rivets 36 to its inner side and a similar plate 37 secured to its outer side. The transverse pivot axis for the hopper is formed by large bolts 38, 39 which extend through their respective uprights 12, 13, bearing plates 35, 36 and side walls 32, 34. A nut 40 is threadably engaged on the inner end of bolts 38, 39 to hold the assembly together.

The hopper also includes end walls 42, 44 which terminate at their lower ends in outwardly turned flanges 45, 46. The bottom 48 of the hopper is arcuate and formed on a radius with the hopper pivot point as an axis. Bottom 48 terminates at its ends in downwardly turned flanges 50, 51 which together with their respective adjacent flanges 45, 46 define openings 52, 53 in the hopper which extend along the entire width of the hopper. These openings are located in the lower part of the hopper and at either end thereof and are parallel to the hopper pivot axis.

It will be noted that the end walls 32, 34 each have portions cut away as at 55, 56 at each of their sides and above the openings. Also above each of the openings and secured to each of the end walls 32, 34 are the knife brackets 60, 61 respectively. These brackets are pivotally secured to their end walls by the rivets 62 and have a series of adjusting apertures 63 which are each adapted to selectively be in registry with and receive the bolt means 64 extending through the end walls. Brackets 60, 61 have outwardly turned flange portions 66 to which are secured by bolt or rivet means 67 the cutting blades 70, 71. The cutting edges 72, 73 of blades 70, 71 respectively, face inwardly, or toward one another, and are located directly above the discharge openings formed by the knife edges and their respective bottom flanges 50, 51. Thus the knives are swingable about rivets 62 as axes, and their cutting edges are adjustably positionable by bolt means 64 to vary their thickness of cut, as will more fully appear. The radius on which the cutting edge is adjustably positioned is sufficient to give good clearance for the cut material regardless of the thickness of cut.

A fixed cutting mechanism which cooperates with the knives to cut the material is mounted within hopper 30 and closely adjacent the bottom as shown in Figure 2 and is rigidly secured to the support structure as follows. Downwardly extending hangers 78, 79 are rigidly secured at the upper ends by lag screws 80 to uprights 12, 13 respectively. Hangers 78, 79 have a laterally inwardly extending portion 81, 82 to permit the ends of the hopper to swing freely between the uprights and the hangers which extend downwardly into the hopper. The hopper pivot bolts 38, 39 also extend through their respective hangers and offer the necessary rigidity to them. The fixed cutting mechanism includes a vertically and transversely positioned baffle plate 84 having a flange 85 (only one shown) at each end which are secured by rivets 86, or other suitable means, to their respective hangers. A cutting block 76 is grooved along its top side for the reception of the lower edge of the baffle plate 84 and is rigidly secured thereto by a series of pins 88 which extend through plate 84 and the block. It will be appreciated that this hopper and knife support construction results in a sturdy device which is necessary to withstand the rather rough treatment it must necessarily be subjected to. The pivot bolts 38, 39 prevent any appreciable movement of the hangers in the direction of knife travel when the latter strike the cutting block. The hangers in turn constitute an inner support for the side walls, i. e., the bolts 38, 39, and help support the weight of the hopper.

A reinforcing strap 90 is secured by rivets 91 around the top edge of the hopper and has outwardly extending portions 92 between which is secured the operating handle 93. A suitable brace 94 connected to the hopper gives the handle the necessary rigidity.

Operation

The hopper is oscillated about its transverse pivot axis and the knife edges 72, 73 alternately come into contact with block 76. As shown in Figure 2 by the dotted lines, the hopper has been swung to its limit in one direction and the knife edge 72 is in cutting engagement with the block. In going from the full line position to the dotted line position, the knife edge 72 has sliced through an entire layer of material on that side of the hopper. The baffle plate 84, which can be of various height, has held the material so it would be engaged by the cutting knife. As the material is being cut and the knife edge is continuing in its movement toward the block, the material that has been sliced is forced out the discharge opening by the sweeping motion of the block relative to the bottom. When the knife makes contact with the block, the latter forcibly ejects the last of the cut material through the discharge opening. While the above knife travel is taking place, the material on the other side of the baffle plate tumbles towards the plate and lays along the bottom of the hopper. As soon as hopper movement is commenced in the opposite direction, the knife edge 73 begins to cut in a similar manner. With this arrangement, the knives have a positive cutting action through an entire layer of material in the hopper. As soon as one knife has completed its cut, the material on the other side has been positioned and upon reversal of the hopper movement cutting action again commences with no lost motion. The cut material is forcibly and completely ejected from the hopper.

I claim:

1. In a vegetable and the like chopper, a support structure, a hopper pivotally mounted on said structure for oscillatory movement relative thereto, said hopper having an arcuate bottom, a pair of knives secured to said hopper adjacent said bottom and in spaced relationship to one another, said knives each having a cutting edge facing one another, a discharge opening in said hopper adjacent and below each of said knife edges, a fixed cutting block rigidly secured to said structure and positioned within said hopper and adjacent said bottom, said knives alternately contacting said block after they cut through material in said hopper as the latter is oscillated and thereby forcing the cut material through said openings.

2. In a vegetable and the like chopper, a support structure, a hopper pivotally mounted on a transverse axis on said structure for oscillatory movement relative thereto, said hopper having an arcuate bottom, a pair of knives secured within said hopper and adjacent said bottom and on opposite sides of said axis, said knives each having a cutting edge facing one another, a discharge opening in said hopper adjacent and below each of said knife edges, a fixed cutting block rigidly secured to said structure and positioned adjacent said bottom and functionally between said knives to alternately cooperate with each of said knives as they cut through material when said hopper is oscillated and force the cut material through said openings.

3. In a vegetable and the like chopper, a support structure, a hopper pivotally mounted on a transverse axis on said structure for oscillatory movement relative thereto, said hopper having an arcuate bottom formed on a radius with said axis as a center, a pair of knives secured within said hopper adjacent said bottom and in spaced relationship to one another, said knives each having a cutting edge facing one another, a discharge opening in said hopper adjacent and below each of said knife edges, a fixed cutting block rigidly secured to said structure and positioned within said hopper and adjacent said bottom and adapted to alternately cooperate with each of said knives to cut through material in said hopper as the latter is oscillated and sweep along said bottom to force the cut material through said openings.

4. In a vegetable and the like chopper, a support structure including a pair of upright members, a hopper pivotally mounted between said members for oscillatory movement relative thereto, said hopper having an arcuate bottom, a pair of knives secured to said hopper adjacent said bottom and in spaced relationship to one another, said knives each having a cutting edge facing one another, a discharge opening in said hopper adjacent and below each of said knife edges, a hanger rigidly secured at its upper end to each of said members and extending downwardly into said hopper and terminating at their lower ends adjacent said bottom, a fixed cutting block rigidly secured to said lower ends and adapted to alternately cooperate with each of said knives as they cut through material when said hopper is oscillated and force the cut material through said openings.

5. In a vegetable and the like chopper, a support structure including a pair of upright members, a hopper pivotally mounted between said members on a transverse axis for oscillatory movement relative thereto, said hopper having an arcuate bottom, a pair of knives secured within said hopper and adjacent said bottom on opposite sides of said axis, said knives each having a cutting edge facing one another, a discharge opening in said hopper adjacent and below each of said knife edges, a hanger rigidly secured at its upper end to each of said members and extending downwardly into said hopper and terminating at their lower ends adjacent said bottom, a fixed cutting block rigidly secured to said lower ends and located functionally between said knives for alternate coaction with each of said knives to slice the material as the hopper is oscillated and force the sliced material through said openings.

6. In a vegetable and the like chopper, a support structure including a pair of upright members, a hopper pivotally mounted between said members for oscillatory movement relative thereto, said hopper having an arcuate bottom, a pair of knives secured to said hopper adjacent said bottom and in spaced relationship to one another, said knives each having a cutting edge facing one another, a discharge opening in said hopper adjacent and below each of said knife edges, a hanger rigidly secured at its upper end to each of said members and extending downwardly into said hopper and terminating at their lower ends adjacent said bottom, a fixed cutting mechanism rigidly secured to said lower ends and adapted to hold the material alternately against each of said knives as they slice therethrough upon oscillation of the hopper and force the cut material through said openings.

7. A device as defined in claim 6 further characterized in that said mechanism includes a block portion against which said knives are adapted to bear and a substantially vertical baffle portion.

8. A slicing machine including a support structure having a pair of spaced upright members, a hopper having an arcuate bottom and substantially vertical side walls, said hopper pivotally mounted by its side walls to said members for swinging movement therebetween, a pair of knives secured within said hopper and adjacent said bottom in spaced relationship to one another, said knives each having a cutting edge facing toward one another, a discharge opening in said hopper adjacent and below each of said knife edges, a hanger rigidly secured at its upper end to each of said members and extending downwardly within said hopper along its respective side wall and terminating at their lower ends adjacent said bottom, a fixed cutting block rigidly secured to said lower ends and adapted to alternately cooperate with each of said knives as they cut through material when said hopper is oscillated and force the cut material through said openings.

References Cited in the file of this patent

UNITED STATES PATENTS

| 35,928 | Fletcher | July 22, 1862 |
| 849,741 | Lewis | Apr. 9, 1907 |
| 888,642 | McPhee | May 26, 1908 |
| 2,524,137 | Pumphrey | Oct. 3, 1950 |

FOREIGN PATENTS

| 510,547 | Germany | Oct. 20, 1930 |